Oct. 7, 1930.  A. E. SPINASSE  1,777,584
APPARATUS FOR AND METHOD OF DRAWING FLAT SHEET GLASS
Filed March 3, 1924
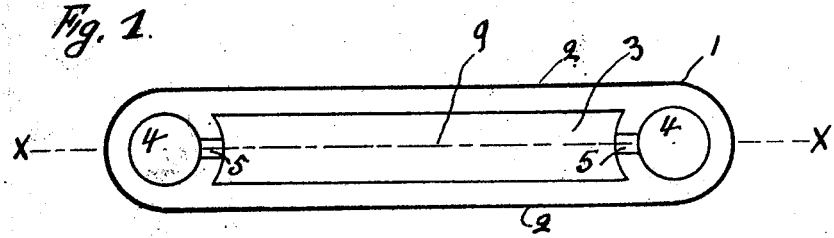
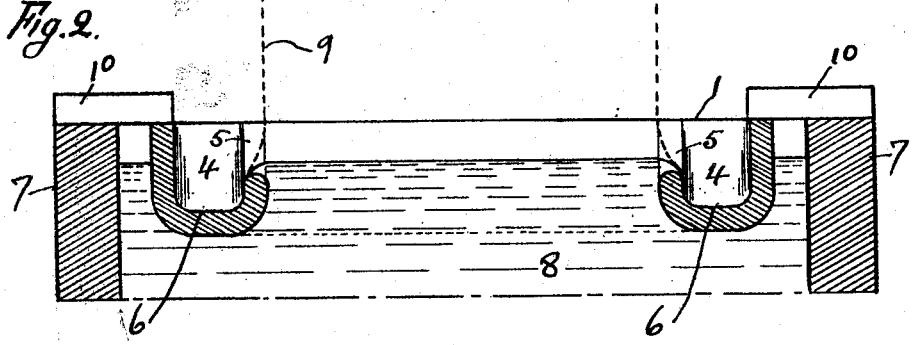
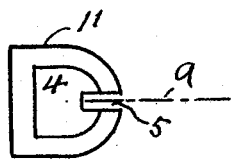
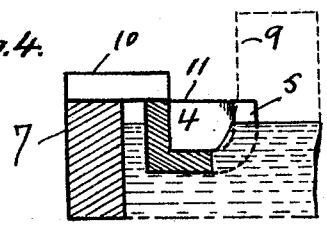
Inventor
Arthur E. Spinasse Patented Oct. 7, 1930

1,777,584

UNITED STATES PATENT OFFICE

ARTHUR E. SPINASSE, OF MOUNT VERNON, OHIO

APPARATUS FOR AND METHOD OF DRAWING FLAT-SHEET GLASS

Application filed March 3, 1924. Serial No. 696,408.

The present invention relates to means and method for maintaining the width of a sheet of glass being drawn from a bath of molten glass by creating anchorage points at the edge producing portions of the glass so restricted that the edges of the sheet are drawn to a thickness substantially equal to or slightly greater, in thickness than the thickness of the finished body portion of the sheet.

In my Patent No. 1,167,534 dated Jan. 11, 1916, I show hollow members having pockets or cavities adjacent the portion of glass from which the article is being drawn, and in my pending applications No. 211,266 filed Jan. 10, 1918, now U. S. Patent No. 1,692,585, granted Nov. 20, 1928, and No. 558,547 filed May 4, 1922, I show and describe devices having glass receiving slots adjacent to hollow pocket members from which to draw the sheet edges in predetermined form or in substantially finished drawn thickness. In my present improvement I extend the glass receiving slot for the edges of the drawn sheet through the side walls of the hollow pocket member or members so that the glass tends to flow into said pockets and is shaped in the slot while being drawn as it is more or less exposed to the air in the interior of said pockets.

Fig. 1, is a top plan view of a suitable form of glass segregating member, and Fig. 2, is a vertical cross sectional view on line X—X of Fig. 1, plus the side walls of a tank furnace and block means for holding the member in drawing position.

Fig. 3, is a top view, and Fig. 4, a vertical sectional view of a slightly modified form of pocket member adapted to form restricted points of anchorage at the edges of the drawn sheet glass.

In Fig. 1, member 1 has parallel side walls 2—2 forming a horizontal glass receiving slot 3 which may be of any desired width, pockets or cavities 4—4 at the end portion of said member being provided as shown and the horizontal slot 3 continued through the walls of said pockets to form the vertical slots 5—5 as shown to receive the edge forming portions of the glass. The bottom 6—6 of the pockets preferably extends below the surface of the glass. In Fig. 2, 7—7 are the walls of a tank furnace which may be of any well known form and adapted to contain molten glass 8. Member 1 as shown is maintained in suitable glass segregating position by any suitable means such as blocks 10—10, so that portions of the glass 8 will have a tendency to pass through the side slots 5 into the pockets of the member. This glass does not fill the pockets however but is drawn to form the edges of the sheet, and the side slots may be adjusted with respect to the level of the glass to supply the required quantity of glass for the drawing of the sheet edges in said side slots. The glass has a tendency to flow outwardly into the side slots 5—5 thereby as shown by dotted lines 9, maintaining the width of the drawn sheet substantially uniform.

The perpendicular side slots 5 leading to the interior of the hollow members of preference are narrower than the maximum thickness of the base of the drawn sheet at the surface of the glass and may vary from ¼ inch to 1 or 2 inches more or less depending on the thickness of the glass which is to be drawn.

In Figs. 3 and 4, I show an independent hollow slotted pocket member rather than a segregating member so that one of these members 11 may be adjusted independently from the other at the edges of the drawn sheet. In this case the side perpendicular slot 5 of the pocket member is somewhat curved to conform with the curve of the forming sheet edge and the slot penetrates more deeply in the glass as shown. Dotted lines 9 indicate the drawn sheet glass. Of course the length of the slot and the width thereof may be varied at will; it may be vertical or at an angle from the vertical, curved or straight and the width thereof may be modified locally and it may extend to different level positions to receive the portion of the glass from which the edge of the sheet takes form. The pocket members may be made of desired material and may or may not adhere to the glass. Preferably the air-filled bowls or pocket-shaped members adhere to the hot glass being drawn and contacting therewith. In order to secure this adherence, the members are maintained sufficiently high in temperature, preferably being red hot, as described in connection with the edging members disclosed in my aforementioned U. S. Patent No. 1,692,585; such adherence assisting in maintaining the desired width of the sheet and producing edge portions of good temper in the sheet.

It is obvious that the slotted portions 5 of Fig. 1, may also be inclined downwardly and outwardly and the slotted pocket portions of this figure may also be used with the independent chamber member shown in Fig. 4. The oppositely disposed side walls of the slots may be of desired contour with substantially flat surface walls as shown. Sheet edges of any desired thickness, with respect to the thickness of the intermediate body portion of the sheet, may also be obtained by varying the space between the walls forming the slot. The segregating slot member from which the intermediate portion of the sheet is being drawn, when used, may also be maintained at the desired level with respect to the surface level of the bath, and the cross sectional area thereof may be varied so that the oppositely disposed walls thereof may be maintained remote from or in proximity to the forming base of the drawn sheet.

The border portion of the forming sheet preferably fits in the slot and is drawn with a retarding dragging action against the inner walls of the slot, and as shown, the walls of the air-filled bowl shaped edging or anchoring members are cut away to form a slot therethrough open at the upper edge of the member and extending downward to the closed bottom of the member. The walls of the member are also preferably inclined or curved upwardly and inwardly toward the forming sheet to effect the gradual shielding of the air within the bowl shaped member and also effecting the proper shielding of the forming edge or border portion of the sheet from the rising heat of the bath, and thereby effecting the gradual cooling and stretching of the forming border portion of the sheet while being exposed to the confined air within the bowl shaped edging member.

Having thus described my present invention, what I claim as new and desire to secure by Letters Patent is:

1. A glass sheet anchorage device comprising a bowl having a slot the lower portion of which forms anchorage means for maintaining the width of the sheet, the side walls of said slot curving upwardly and inwardly at opposite margin portions of the sheet.

2. A device for maintaining the width of drawn sheet glass comprising an air-filled hollow member having a slot through the side walls thereof through which the border portion of the sheet passes.

3. In apparatus for drawing sheet glass from a bath of molten glass, an edging member comprising an air-filled bowl shaped member having a shaping slot in the side wall thereof engaging the initially drawn border of the sheet.

4. In apparatus for drawing sheet glass from a bath of molten glass, independent edge anchoring means comprising hollow air-filled pocket members having slots in the side walls thereof at an angle from the vertical and through which slots the side edge portions of the sheet are drawn in contact therewith and shaped in desired reduced thickness.

5. In apparatus for drawing sheet glass from a bath of molten glass, means for maintaining the desired width of the drawn sheet comprising a pair of air-filled bowl shaped members, one on each side of the sheet, said members having each a slot through the side walls thereof engaging the initially drawn border portions of the drawn sheet and adhering thereto.

6. In apparatus for drawing sheet glass from a bath of molten glass, a pair of air-filled hollow devices having each a slot in the side walls thereof through which the border portions of the sheet are directly drawn and shaped in desired thickness with the edges of the sheet exposed to the air within said hollow devices, and means for maintaining said hollow devices in desired fixed position with respect to the drawn glass.

7. In apparatus for drawing sheet glass from a bath of molten glass at a particular level, an edging member comprising an air-filled hollow member with its lower portion in fixed position in the glass bath for counteracting the narrowing tendency of the drawn sheet, said member having a slot cut-away in the side wall thereof projecting above the surface level of the bath and engaging the initially drawn border portion of the sheet for shaping the same in desired reduced thickness.

8. In apparatus for drawing sheet glass from a bath of molten glass, means for counteracting the narrowing tendency of the sheet comprising an air-filled bowl shaped member having its side cut-away to form a slot therein extending from the lower to the upper portion thereof, and means for maintaining said member in fixed position with the lower portion of the slot in the glass bath and the remaining portion of said slot thereabove projecting above the normal level of the bath and engaging the border portion of the sheet.

9. In apparatus for drawing sheet glass from a bath of molten glass, means for maintaining the desired width of the drawn sheet comprising a hollow member having side walls and a closed bottom and having a perpendicular slot cut-away through said side walls extending to the bottom thereof, and means for maintaining said member in fixed position so that the border portion of the sheet will anchor at the base of the slot and will pass upwardly in adherent dragging contact through said slot for reducing said border portion in desired thickness.

10. In apparatus for drawing sheet glass, an edging member comprising an air-filled hollow member having a part with an open slot therein for engaging the drawn edge portion of the sheet, said part and slot being inclined upwardly on the side of the sheet for shielding the rising edge portion of the sheet which passes through the slot.

11. Means for shaping and maintaining the position of the border portions in sheets of glass being drawn from the normal surface of a bath of molten glass, comprising a refractory body having an air pocket therein shielded from the surrounding heat from the furnace and glass bath, said body further having a slot in the side wall thereof extending to the air pocket to engage the initially drawn border portion of the sheet in adherent dragging contact therewith and to expose the initially drawn border portion to the shielded air within said pocket.

12. In apparatus for drawing sheet glass from a bath of molten glass, means for preventing inward movement of the edge of the sheet, comprising a bowl-shaped member having an open slot in its side wall engaging the drawn border portion of the forming sheet.

13. In apparatus for drawing sheet glass from a bath of molten glass, means for maintaining the desired width of the sheet comprising a hollow air containing shielding member having a closed bottom portion and its upper portion open, said member further having an open slot in its side wall of greater width than the finished thickness of the sheet and fitting over the initially drawn border portion of the forming sheet to expose said border portion to the air within said hollow member.

14. In apparatus for drawing sheet glass from a bath of molten glass, means for forming an edge on the sheet comprising an air containing pocket-shaped member having a side wall, an open top and a closed bottom portion, said member further having a slot extending downwardly from the upper edge of its side wall and then inwardly to the bottom portion thereof for engagement with the drawn glass at the border portion of the sheet whereby to expose said border portion to the air within the pocket of said member and maintain the desired width of the sheet.

15. In apparatus for drawing sheet glass from a bath of molten glass, means for preventing the narrowing of the forming sheet comprising a pair of bowl-shaped members fixed in position adjacent the forming border portions of the sheet, said bowl-shaped members having each an open slot extending outward and upward from their bottom portions to the upper edges thereof and engaging the border portions of the forming sheet, the walls of said bowl-shaped members being of substantial thickness and extending a substantial distance from the forming border portions of the sheet.

16. In apparatus for drawing sheet glass from a bath of molten glass, means whereby the meniscus of the sheet may be drawn free from contact with shaping refractory walls except at the border portions, and slotted anchoring members having air pockets therein through which the border portions extend and drag in adherent contact with the walls of the slots and exposed to the air in the air pockets.

17. In apparatus for drawing sheet glass from a bath of molten glass, a receptacle for containing the molten glass, an edging device comprising a bowl-shaped member adapted to take position adjacent the wall of the receptacle and having a slot in its side wall engaging the rising border portion of the sheet, and means extending above the wall of the receptacle for holding the bowl-shaped member in desired position.

18. The process for forming the edges of glass sheets, which consists in creating cooling air spaces adjacent the initially-drawn edge portions of the sheet, while shielding the air spaces from the surrounding heat, and drawing the sheet edges through slotted edge-holding members with adherent dragging contact upon the walls of the slotted portions and exposed to the air in the air spaces.

19. The process for forming the edges of sheet glass, which consists in maintaining an air space adjacent the initially formed edges of the sheet, shielding the air space from the surrounding heat, and drawing the edges of the sheet with tension past the air space.

20. The process for forming sheet glass of uniform width from a bath of molten glass, which consists in maintaining air pockets adjacent the border portions of the initially drawn sheet, shielding the air pockets from the surrounding heat from the molten bath, drawing the border portions of the sheet through slots in anchoring members with the border portions exposed to the shielded air pockets and in adherent dragging contact upon the walls of the slotted portions, and drawing the remaining portion of the sheet from the free open surface of the bath.

21. In apparatus for drawing sheets of glass from a substantially open bath of molten glass, stationary air-filled hollow anchoring member having an open slot extending through the side wall thereof for engaging the forming border portion only of the sheet, the inner walls of the slot being flat for flattening the border portion of the sheet in reduced thicknes.

22. In apparatus for drawing sheets of glass from a substantially open bath of molten glass, an edging device comprising a normally stationary hollow member having a side wall, a closed bottom and an open top, said member further having a sheet border receiving slot about one inch wide through its side and opening through its top edge and extending into and toward the middle portion of the bottom and being disposed for receiving the border portion only of the forming sheet with a dragging action of said border portion against the inner wall of the slot.

23. In apparatus for drawing sheets of glass from a substantially open bath of molten glass, a stationary air-filled hollow edging member for maintaining the desired width of the drawn sheet, said member being open at its top and closed at its bottom and having a slot for receiving and adherently engaging the border producing portion of the glass of the forming sheet with a dragging action, said slot extending through the side wall of the hollow edging member and opening through the upper edge of the member and the walls forming the slot curving downwardly toward the bottom and center of the member, whereby the forming border portion of the sheet passing through the slot will be exposed to the air within the hollow member and at the same time be shielded from the surrounding heat and rising heat from the molten glass bath.

24. The process for drawing sheets of glass, which consists in drawing the sheet from a substantially open bath of molten glass, creating air spaces adjacent the forming border portions only of the sheet, drawing the forming border portions only of the sheet through slotted edge-holding members while maintaining said members against any movement, and in dragging said border portions in adherent retarding contact against the inner walls of the slots in said members to thereby stretch said border portions and counteract the narrowing tendency of the sheet, at the same time exposing the forming border portions of the sheet to said air spaces and shielding said border portions and air spaces from the surrounding heat and rising heat from the molten glass bath.

In testimony whereof, I affix my signature.

ARTHUR E. SPINASSE.